(12) United States Patent
Bulkley

(10) Patent No.: X3355
(45) Date of Patent: Aug. 7, 1821

(54) WATER WHEEL, OBLIQUE

(76) Inventor: Ralph Bulkley

Ralph Bulkley
Letters Patent dated 7th August 182[illegible]

The Schedule referred to in these Letters Patent,
and making part of the same containing a descrip
tion in the words of the said Ralph Bulkley him
self of his improvement, being an "Oblique water
wheel."

To all persons to whom these Presents shall
come, I Ralph Bulkley of the city of New York
in the county and State of New York, send greeting:
Be it known that I the said Ralph Bulkley have
invented constructed, made, and applied to use a new
and useful improvement, being an oblique water wheel
or machine to be used for the purpose of propelling
steam batteries or vessels of war of any description, or
other vessels or boats of any description, whether the
same are moved by steam or other power, either up-
on the ocean, lakes, bays, harbours, rivers, creeks,
or canals; Also to be used in a stationary position
in currents produced by tide in harbours, or other
places in rivers, creeks, canals, or streams of any
description either where there is a rapid or slow cur
rent, for the purpose of moving mills of all descrip
tions or manufactories of all descriptions, or for the
purpose of forcing or pumping water from rivers,
harbours, creeks, canals, or other places for the purpose
of filling reservoirs, or for any other use that may be
required. The said improvement is called the "Oblique
water wheel," and may be specified in the words
following, to wit, four or more paddles are placed
upon the opposite sides of an axle or shaft, in a diagonal or oblique position to the direction of the
shaft, and all inclining in the same direction,
making an angle with the shaft or axle of forty
five degrees, or a greater or less angle as may be
found convenient, the paddles being placed upon
the shaft in a position similar to the position
of the sails of a windmill; but varying in obliqu
ity as convenience may require. And the wheel may
consist of a shaft or axle and one or more setts of
paddles placed upon it, at a short distance from each
other. models of which are deposited in the Patent
Office: and one of the forms or shapes of said wheel
may be represented in the following manner.
Let the superficies of a circle be divided into four
equal parts by lines drawn through the centre; and
let each quarter of the circle be bent from its position
in an equal degree, keeping the center points togeth
er, and making an angle at the circumference of each
quarter with the former circumference of forty-five de
grees, or such other angle as may be found convenient,
and in such a manner that the circumference of the
former circle shall run through the centre or middle
part of the circumference of each quarter of the circle
so bent from its former position.

If the wheel is to be applied for the purpose
of propelling steam ships, or other vessels or boats, a sin
gle sett of paddles is considered preferable; but if applied
stationarily in streams or currents of water for any of
the purposes above mentioned, the wheel may consist
of one sett or of several setts of paddles secured at
proper distances from each other upon the shaft or axle
And in either case the wheel may be wholly or partic
ularly immersed in the water as may be preferred or found convenient, and the pressure of the water is in a direction oblique to the direction of the shaft or axle, wherein as in its form, as above described, it differs from all other wheels in use, for any of the purposes aforesaid.

The wheel above mentioned may be applied to the stern, bottom, or sides of a steam battery, steam ship, or other vessel or boat, and may be either wholly or partially immersed in the water. If applied to the stern of a ship, vessel, or boat, a shaft or axle enters through the stern at a suitable distance below the surface of the water to permit the wheel to be either partially or entirely immersed as may be required and upon this shaft or axle the paddles are secured in the manner above described. If used at the sides or bottom of the ship, vessel, or boat, the wheel will also be connected with the machinery by means of a shaft or axle entering the vessel or boat, and the motion of the shaft or axle being to carry the oblique action or pressure of the paddles upon the water produces a strong propelling power.

If placed in a current produced by the tide where the current moves part of the time, in one direction, and part of the time in the contrary direction, the wheel will move with equal rapidity and equal force, whether the water strikes against the front or rear; and the wheel may be wholly or partially immersed in the water as the situation in which it is used may require. The angle or oblique direction of the paddles may also be varied, according to the rapidity of the current, or as will best answer the purposes designed by using it, such as forcing or pumping water or moving mills or manufactories, as above mentioned; or for any other purpose where a force or power, thus obtained, may be applied to advantage, and where used for these or other purposes, the axle or shaft of the wheel will be connected with the machinery to be moved by it.
The shaft of the axle of the wheel, above described
may be made of wood or iron, or other metallic substance,
as may be found most suitable in the situation in which
the wheel is used, and the paddles or buckets may be ma
de of wood, copper, iron, or other substance, and of great
er or less thickness and strength according to the situa
tion in which used, and the power intended to be gain
ed by it, and to be secured firmly to the shaft or axle
by means of rivets or bolts, or in various other ways as
may be most convenient: And the paddles may be
made in the form of a quarter of a circle, or of a square,
oblong, triangular, or other shape. And the paddles may
be separate, and placed separately upon the shaft or
axle, and secured to the shaft, as a hoe is secured to its
handle, with the addition of rivets or bolts through
the shaft; or the paddles may be joined or connected
at the center, and secured together upon the shaft or
axle, by means of a hole through the center of the
wheel through which the shaft or axle may be inser
ted or in such other manner as may be found convenient.
Among the advantages of the wheel or machine
above described, the following may be enumerated; to wit:
that it may work either wholly or partially under
water, as may be found convenient; and it is believed that
the same force acting upon a wheel, constructed as above
described, upon the principle of oblique pressure would
propel a ship vessel, or boat faster than if acting upon
the wheels in common use are applied: and such a wheel
being attached to a steam battery, or ship of war, and
being wholly immersed in the water, would not be
exposed to the same accidents from shot to which the
wheels in common use are exposed: and being wholly immersed its motion would not be materially impeded
by waves or a dashing sea: and when used stationarily in
harbours, rivers, creeks, canals, or other streams an ade
quate force may be obtained by means of the oblique pres
sure of the stream upon the wheels and may be applied
to the purposes above mentioned or to other purposes when
a force or power thus obtained may be found convenient
& useful.

Witnesses
J Bulkley
Daniel [illegible]

Ralph Bulkley

[illegible]

([illegible] recorded 20 Jany 1844)

Not thought necessary to make
a drawing of

DRAFTSMAN'S DIVISION.

All communications should be addressed to "The Commissioner of Patents, Washington, D. C."

2—328 a.

DEPARTMENT OF THE INTERIOR,

United States Patent Office.

Washington, D. C., ______ 189_

SIR:

The printed copies of Patent No. K. [illegible]
are exhausted. Aug 7, 18[illegible]

As soon as reprinted a copy will be mailed you to complete your order.

By direction of the Commissioner:

Very respectfully,

Chief Clerk.

31484-97-5m